UNITED STATES PATENT OFFICE.

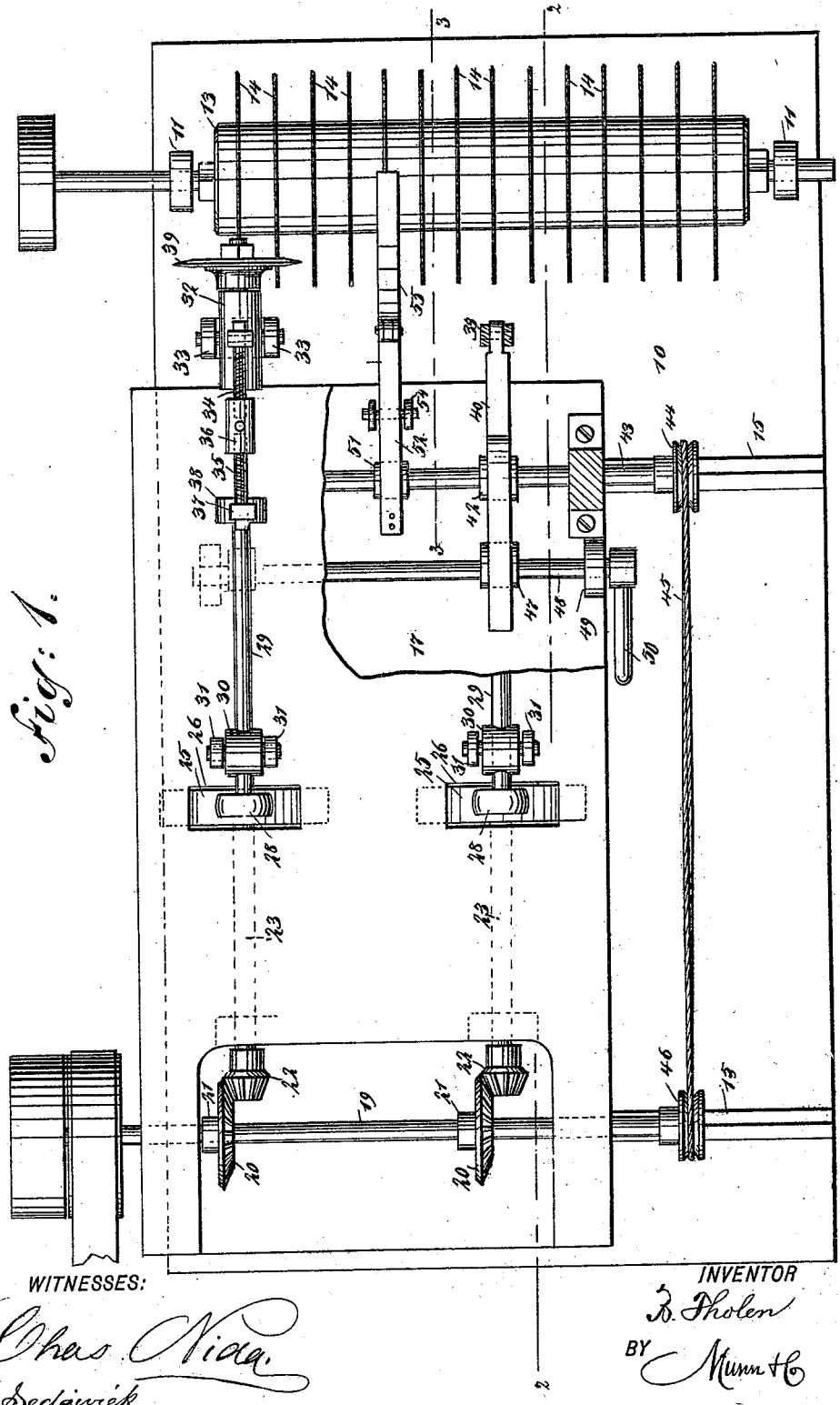

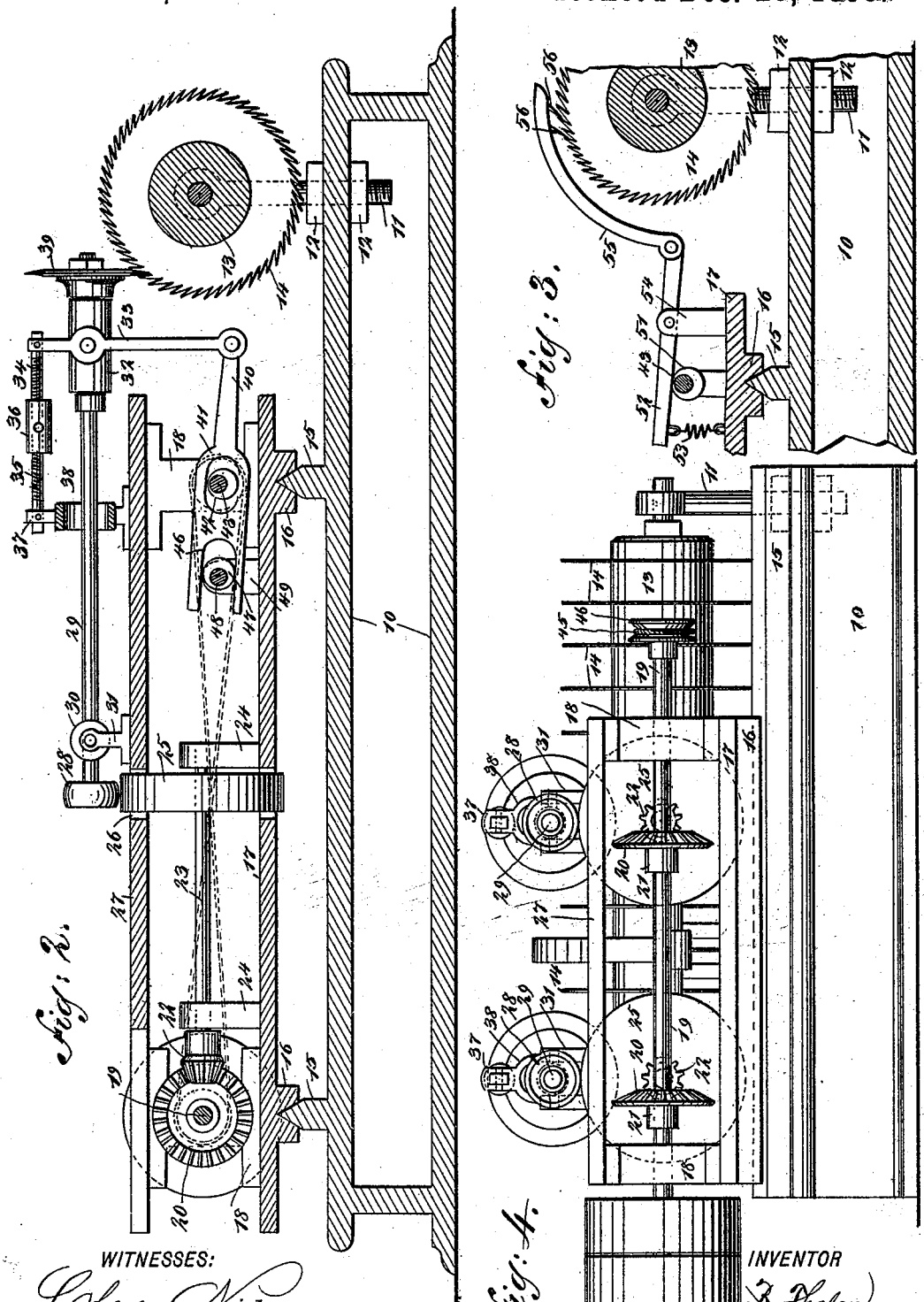

BEN. THOLEN, OF TEXARKANA, ARKANSAS.

SAW-FILING MACHINE.

SPECIFICATION forming part of Letters Patent No. 511,561, dated December 26, 1893.

Application filed March 23, 1893. Serial No. 467,354. (No model.)

*To all whom it may concern:*

Be it known that I, BEN. THOLEN, of Texarkana, in the county of Miller and State of Arkansas, have invented a new and Improved Saw-Filing Machine, of which the following is a full, clear, and exact description.

My invention relates to improvements in saw filing machines; and the object of my invention is to produce a very simple and efficient machine which is adapted to rapidly and accurately file or grind and sharpen cotton-gin or similar saws, and which is arranged in such a way that the entire cylinder of a gin, having the whole series of saws attached, may be hung in the machine and the saws quickly ground.

To this end my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a broken plan view of the machine embodying my invention, showing a set of gin saws in position to be sharpened. Fig. 2 is a longitudinal section on the line 2—2 in Fig. 1. Fig. 3 is a broken vertical section on the line 3—3 in Fig. 1, and Fig. 4 is an end view of the machine.

The machine is provided with a suitable base or frame 10, which at one end, carries oppositely arranged screw standards 11, these being adjusted vertically and held in place by means of nuts 12 arranged above and below the frame top, and these standards are adapted to serve as bearings for the mandrel of the saw cylinder 13, this being of the usual kind and having the usual gin saws 14 thereon.

On the top of the frame 10 are transverse tracks 15 having their upper sides terminating in edges, and on these tracks are held to run the guides 16 on the under side of a platform 17 which forms a base for the grinding mechanism; and the arrangement just described permits the platform to be moved transversely so as to bring the grinders or files into proper position in relation to the saws, as hereinafter described.

On the platform 17, near the ends, are brackets 18, which support the table and two of which also support a shaft 19 having suitable driving pulleys, and this shaft is provided with beveled gear wheels 20 having hubs 21 which are keyed to the shaft so as to slide thereon and turn therewith, this being accomplished in the usual and well known way. The gear wheels 20 engage bevel pinions 22 on the shafts 23, which shafts extend at right angles to the driving shaft and are supported in hangers 24 on the platform 17. Each shaft 23 carries near its inner end a friction wheel 25 which turns through a slot 26 in the table 27 above it, this table extending parallel with the platform 17 and being supported by the brackets 18. The friction wheels 25 turn smaller wheels 28 on the shafts 29, which shafts extend horizontally along the table top parallel with each other and project beyond the end of the table next the saws 14. The shafts 29 are, at the ends next the friction wheels, journaled in boxes 30 which are pivoted in supports 31 on the table, and this arrangement permits the shafts to have a limited vertical motion to provide for the movement of their outer ends and of the grinders carried thereby. The outer ends of the shafts 29 are journaled in boxes 32 which are pivoted in substantially vertical levers 33 which hang down below the table, and the upper end of each lever 33 projects above the box 32 and is connected by right and left screws 34 and 35 and an adjusting nut 36 on the screws with a support 37, which is secured to the table and which is formed into a ring 38 to embrace the shaft 29. The outer end of each shaft 29 carries a circular file or grinder 39, which is adapted to fit between the teeth of the saws 14, and by rapidly rotating, to sharpen the teeth with which it comes in contact. The lower end of each lever 33 is pivotally connected with a tilting and nearly horizontal lever 40 which, near the center, is slotted, as shown at 41, and held to ride on an eccentric 42 which serves as the fulcrum of the lever and which is carried by a shaft 43, this being supported in suitable bearings and is provided with a grooved pulley 44 which is driven by a belt 45 connecting with a similar pulley on the shaft 19. The inner end of each lever 40 is slotted, as shown at 46, and this slotted end rides on an eccentric 47 on a cross shaft 48 which is journaled in supports 49 on the platform 17 and has at one end a handle 50 by which it may be turned. It will be seen then that by turning the handle and the shaft 48, the eccentric 47 may be made to tilt the lever 40 and thus move the lever 33 and shaft 29 vertically, and in this way the grinder 39 may be nicely adjusted. The arrangement just described enables the grinder to be moved by hand, but it is automatically moved so as to be alternately raised and lowered to strike the saw teeth one by one, as hereinafter described, by the eccentrics 42 on the shaft 43. The shaft 43 is also provided near the center with an eccentric 51 on which rides a lever 52, the inner end of which is normally pressed down toward the platform 17, by a spring 53 which connects it with the platform; and the lever is fulcrumed in a suitable support 54 in the platform. To its outer end is pivoted a pawl 55, which is curved so as to approximate the curvature of the saws, and it is provided, on its under side and near its free end, with teeth 56, which are adapted to engage the teeth of a saw and thus drag the saw forward and so turn all the other saws.

The operation of the machine is as follows:—The saws to be sharpened are suspended in the standards 11 in the manner described, the grinders are adjusted so as to register with the teeth of the saws, the grinder shafts 29 being moved longitudinally by means of the nuts 36, and the connected screws, and the machine is then set in motion. The turning of the shaft 19 causes the grinders 39 to be turned rapidly by means of the gear mechanism connecting the grinders and the shaft, and the shaft 19 also drives the shaft 43, which by means of the eccentrics 42 and the levers 40 and 33, alternately raises and lowers the grinders, the movement being sufficient to cause the grinders to be lifted each time high enough to clear the saw teeth and then drop back between the next two teeth. At the moment the grinders are lifted, the eccentric 51 actuates the lever 52 and pawl 55, so as to cause the saw to be drawn forward the distance of a tooth, and in this way the saws are automatically advanced tooth by tooth until the saws opposite the grinders are sharpened. The platform 17 is then pushed along the tracks 15 so as to bring the grinders opposite another pair of saws and this operation is repeated until the whole series of saws is sharpened.

It will be understood that the table may be provided with any number of shafts 29, grinders 39, and driving mechanism for operating the grinders, without changing the principle of the invention.

Having thus described my invention, I claim as new and desire to secure by Letters Patent—

1. The combination with a support having a rocking bearing mounted thereon, of a shaft turning and sliding in said bearing and having a driving gear at its rear end and a sharpener on its outer end, a second bearing through which the forward end of the shaft passes, a lever to and between the ends of which said second bearing is pivoted, a turnbuckle pivoted at one end to the said support and at its other end to the upper end of said lever, and a vertically rocking lever to which the lower end of the first named lever is pivoted, substantially as set forth.

2. The combination with the sharpener shaft pivoted at its inner end, of a tilting lever pivotally connected at its outer end with the outer end of said shaft, provided at its inner end with an adjustable axis and means for tilting or rocking said lever to raise and lower the sharpener shaft, substantially as set forth.

3. The combination with the sharpener shaft pivoted at its inner end, of a tilting or rocking lever pivotally connected at its outer end with said shaft and an adjustable cam or eccentric on which the inner end of the said lever is mounted and a rotary cam or eccentric engaging the lever between its ends to impart a rocking motion thereto to raise and lower the sharpener shaft, substantially as set forth.

4. The combination with the suitable support having a rocking bearing, a sharpener shaft sliding and turning in said bearing and gearing for rotating the shaft from its inner end, of a bearing in which the outer end of said shaft turns, a lever carrying said bearing, a means for adjusting the outer bearing and shaft together longitudinally, a tilting lever pivoted at its outer end to the lower end of the first named lever, and the adjusting and operating cams or eccentrics engaging the tilting lever, substantially as set forth.

5. A saw filing machine, comprising a base having vertically adjustable supports thereon adapted to carry a saw mandrel, tracks extending transversely across the base, a movable platform held to slide on the tracks, a table supported upon the platform, a driving shaft arranged at one end of the platform between the table and platform, longitudinally extending shafts extending between the table and platform and geared to the driving shaft, parallel shafts supported upon the table top and projecting beyond one end of the table, friction pulleys connecting the shafts above and below the table, grinders carried by the shafts above the table and adapted to engage the saws, means for adjusting the grinder shafts vertically and longitudinally, an eccentric shaft arranged beneath the table, a tilting lever actuated by the eccentric shaft, and a toothed pawl carried by the lever and adapted to engage the teeth of a saw, substantially as described.

6. The combination with the longitudinally extending sharpener shaft, of a transverse shaft having parallel cams or eccentrics, a vertically rocking or tilting lever operated by one of said cams or eccentrics and connected with the sharpener shaft to raise and lower the outer end thereof, and a second tilting lever engaged by the other cam or eccentric and carrying a pawl to engage a saw of the series next to the one being sharpened, substantially as set forth.

7. The combination with parallel sharpener shafts and driving mechanism therefor, of a transverse rotary shaft having a series of cams or eccentrics certain of which are operatively connected with the sharpener shafts to raise and lower them, and a lever and pawl mechanism intermediate of said sharpener shafts and operated by the intermediate cam of the series, said pawl being adapted to engage a saw of the series intermediate of those being acted upon by the sharpeners, substantially as set forth.

8. A saw sharpener comprising the platform having transverse tracks or ways and opposed saw mandrel supports in front thereof to support a gang of saws, and a table mounted on the said tracks and provided with vertically rocking bearings, longitudinally extending sharpener shafts sliding and turning in said bearings and extending beyond the table toward the saws to be sharpened, driving mechanism carried by the table and geared to the inner ends of the said shafts, longitudinally adjustable bearings in which the outer ends of the sharpener shafts are journaled and by which the shafts may be similarly adjusted, levers carrying said bearings, rocking levers connected at their outer ends to the first named levers and having adjustable axes at their inner ends, a transverse cam shaft operating the tilting or rocking levers, and a lever and pawl mechanism also operated from the cam shaft, substantially as set forth.

BEN. THOLEN.

Witnesses:
J. H. CRUMB,
J. W. TALBOT.